Oct. 10, 1939.  U. G. ENT  2,175,186
GROUND SPEED AND DRIFT METER
Filed March 5, 1938
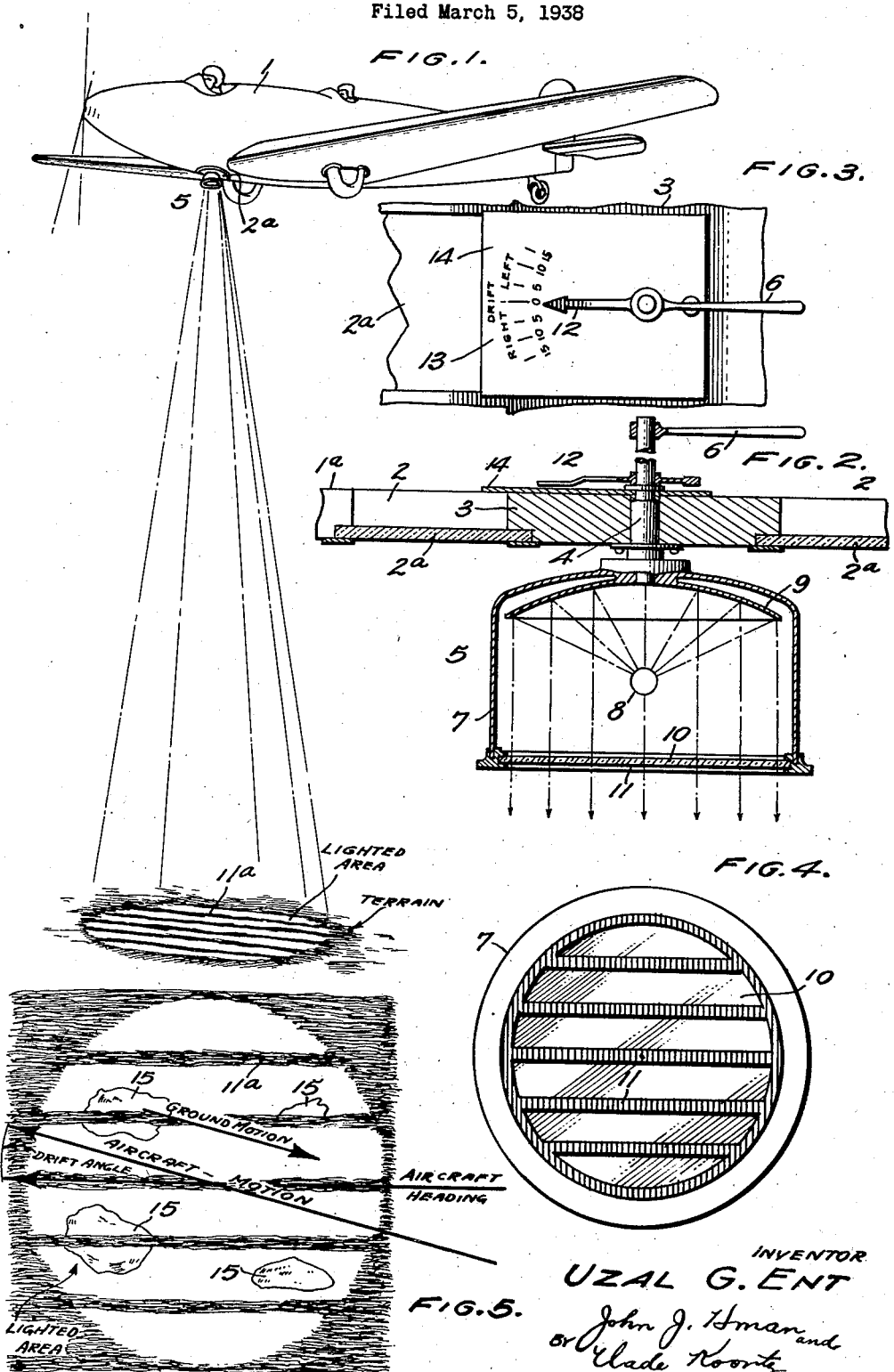

Patented Oct. 10, 1939

2,175,186

UNITED STATES PATENT OFFICE 2,175,186

GROUND SPEED AND DRIFT METER

Uzal G. Ent, Fort Leavenworth, Kans.

Application March 5, 1938, Serial No. 194,070

7 Claims. (Cl. 33—46)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to improvements in aircraft navigational instruments of the type known as ground-speed and drift meters.

Instruments of this type are used to enable the navigator of aircraft to determine the values of drift and ground speed. They depend upon sight of the ground and have as their primary function the measurement of drift angle; that is, the horizontal angle between the fore-and-aft axis of the aircraft and its path relative to the ground as indicated by the apparent line of motion of objects on the ground.

In some instruments, the ground is observed through an eyepiece and the instrument is so rotated around a vertical axis that objects on the ground appear to travel along a sight wire. The angle of drift is then read on a scale. In other instruments, an image of the ground is thrown upon a ground glass screen which is rotatable and provided with parallel sight wires and an angular scale. To ascertain the drift, the screen is rotated until objects on the ground appear to travel in a line parallel to the sight wires. The angle of drift is then read directly from the scale.

In daytime, during clear weather, objects on the ground may be observed with little difficulty but to take a drift reading when flying at night it is necessary either that the ground be illuminated by dropping flares or that the aircraft be passing over lighted objects of sufficient brilliancy to show up clearly on the ground glass screen. The fact that the satisfactory use of the instrument is dependent upon such contingencies constitutes a restriction and disadvantage which the present invention is designed to eliminate.

It is, therefore, an object of the present invention to provide a ground-speed and drift meter which is self-sufficient and which may be used to ensure the necessary accuracy in the navigation of low flying aircraft, particularly military aircraft, at night in the face of radio silence and overcast skies. To this end, the light which is used to illuminate the ground, water, or other terrain forms an essential element of the ground speed and drift meter and is designed to produce upon the terrain a lighted area having a grid pattern by means of which the angular motion or drift of the aircraft relative to the ground can be observed.

A further object of the invention is to provide a novel method of measuring drift and ground speed by the use of a beam of light which will greatly simplify the problem of accurate avigation at night or during other darkened atmospheric conditions.

With the above and other objects in view, the invention comprises the novel combination and arrangement of parts hereinafter more fully described and explained, with reference to the accompanying drawing, wherein:

Figure 1 is a schematic view illustrating a practical application of the invention;

Figure 2 is a vertical sectional view of the light projector and component parts of the invention;

Figure 3 is a top plan view of the drift scale, pointer, and light turning means appearing in Figure 2;

Figure 4 is a bottom plan view of the light projector and shaded lens; and

Figure 5 is a plan view illustrating the character of the lighted area or grid produced on the ground in accordance with the invention.

Broadly, the ground speed and drift meter of the invention comprises a high powered electric search light or other suitable means of projecting the required amount of light. The beam from the light projector is divided by the use of double filaments or is partially obscured by shaded lenses, shaded reflectors, or by some other means or device which will cause the area of light projected on the surface of the ground, water, or other reflecting surface to appear as a lighted circle, square, rectangle, or other convenient shape gridded with one or more shaded areas or sight lines. The projector is so mounted in an aircraft that it may be turned manually, mechanically, electrically, or in some other manner so that the shaded areas or sight lines of the lighted area will make a definite angle with the fore-and-aft axis or the lateral axis of the aircraft and so that such angular movement of the projector can be read on an azimuth scale or recorded on a recording drum. The method of observing the lighted area from the aircraft may be either direct or indirect. The pilot or member of the screw may view it directly over the side of the aircraft or through a transparent panel mounted in the side, bottom or other part of the aircraft adjacent the light source or concentric therewith. It may be viewed indirectly through a conventional system of lenses and prisms or both so mounted as to be convenient to the user's natural line of sight or an image of the illuminated ground area may be reflected upon a ground glass or similar reflecting surface mounted on the instrument board or in some other convenient place for the use of the pilot or navigator.

In the specific embodiment illustrated in the drawing, 1 represents a conventional low wing monoplane having an observation opening 2 in the floor 1a of the fuselage in which is diametrically arranged a cross member 3. Journaled in the cross member 3 is a short vertical shaft 4. This shaft is provided at its lower end with a cylindrical light projector 5 arranged to direct a beam of light downward and at its upper end has a handle 6 for rotating the projector about its axis. The projector extends for less than the full diameter of the observation opening 2 in order that the ground may be viewed by the pilot or navigator through a transparent panel 2a extending between the outer edge of opening 2 and the center cross member 3. The projector consists of a casing 7 enclosing a lamp 8, the rays of light from which are reflected from a reflector 9 downward through the projector lens 10. The lens is provided with one or more parallel shaded areas or sight lines 11 so that the circular spot of light appearing on the ground, water, or other terrain has a grid formation or pattern, as illustrated in Figures 1 and 5; the dark lines 11a of the lighted areas corresponding to the shade lines 11 of the projector lens. As previously pointed out, however, the projector also may be designed to cause the illuminated area of the reflecting surface to appear as a lighted square, rectangle, or other geometrical figure, as desired, and the grid pattern may be developed by means other than the shaded lens. To provide for reading the angular movement of the projector, the shaft 4 of the latter has a pointer 12 suitably affixed thereto for movement across a drift scale 13; the latter being provided on a plate 14 mounted on the floor or cross member 3 of the fuselage, as shown in Figures 2 and 3. The pointer 12 is mounted in fixed parallel relation with respect to the shaded areas or grid lines 11a of the projected light beam so that they move together and in the neutral or zero reading position of the device, the pointer and grid lines are parallel to the fore and aft axis of the aircraft.

In the operation of the device to measure the angular motion or drift of the aircraft relative to the ground or other terrain, the projector 5 is rotated either to the right or left until the shaded areas or sight lines 11a, as viewed through the transparent panel 2a, are parallel to the relative motion of (or the apparent movement of objects 15 on) the reflecting surface appearing in the lighted area. The angle of drift is then read on the drift scale 13. By timing the progress of ground objects relative to measured portions of the lighted area, or by some other similar method, a measure of the ground speed is obtained.

Although but one species of the invention has been specifically illustrated and described, it is to be expressly understood that various changes in the construction, arrangement, and proportion of parts may be made within the scope of the appended claims.

Having thus described the invention, I claim:

1. A drift meter for aircraft comprising means carried by the aircraft and on the underside thereof for projecting on to the ground, water, or other subjacent reflecting surface a spot of light gridded with one or more parallel shaded areas or lines, said aircraft having an optically opened bottom portion through which to view the lighted surface and said means being so mounted in the aircraft that it may be turned for placing the shaded areas or lines in parallelism with the direction of motion across the lighted area of observed ground objects; and means actuated by the turning of the light projecting means for indicating the angle through which the light projecting means is turned.

2. A drift indicator for aircraft comprising a light projector carried by the aircraft and adapted to project upon a reflecting surface outside of the aircraft a light image of convenient shape gridded with one or more parallel shaded areas or lines, said projector being so mounted in the aircraft as to be capable of being turned for placing the shaded areas or lines at an angle to the fore and aft axis of the aircraft; and angle-measuring means actuated by the turning of the light projector for indicating the angle through which the projector is turned.

3. A drift indicator for aircraft comprising a rotatable light projector adapted to be mounted on the aircraft to direct a beam of light toward the ground for illuminating an area thereof, means separating the beam to cause the illuminated area to appear as a convenient geometrical figure gridded with one or more parallel shaded areas or lines, and means for turning the projector to place the parallel shaded areas or lines of the figure in parallelism with the apparent movement of observed ground objects appearing in the illuminated areas of the figure.

4. A drift indicator for indicating drift of an aircraft at night or during other darkened atmospheric conditions which comprises a light projector adapted to be mounted in the aircraft for directing a beam of light toward the ground or other terrain, a grid-like member disposed in the path of the beam of light for partially obscuring the beam to produce on the said terrain alternate parallel lighted and shaded areas, and means for turning the member to place the said shaded areas in parallelism with the apparent movement of ground objects appearing in the lighted areas.

5. A device for use in determining ground speed and drift of an aircraft at night or during other darkened atmospheric conditions comprising means for projecting from the aircraft to the ground a beam of light a lens in the path of the beam and provided with parallel alternate opaque and transparent linear areas so that the image of the beam as projected upon the ground will have a grid pattern, means for turning the lens to bring the opaque areas in parallelism with the direction of motion of observed ground objects appearing in the lighted areas of the grid, a scale fixed to the aircraft, and a pointer carried by the lens-turning means in cooperative relation with the said scale.

6. A device for use in determining ground speed and drift of an aircraft at night or during other darkened atmospheric conditions comprising light projecting means mounted externally on the aircraft for projecting from the aircraft to the ground a beam of light having a grid pattern, mechanism operated from within the aircraft for turning the light projecting means to bring the grid in parallelism with the motion of observed ground objects appearing in lighted areas of the grid, a fixed scale within the aircraft, and a pointer carried by the said mechanism in fixed parallelism with shaded areas of the grid and in cooperative relation with the said scale.

7. A device for use in determining ground speed and drift of aircraft at night and during other darkened atmospheric conditions comprising a light projector located on the underside of the aircraft for projecting a beam of light to the ground, water, or other reflecting surface to illuminate a portion thereof, said projector having an upwardly extending shaft journaled in an opening in the bottom end of the aircraft, means carried by the projector for partially obscuring the beam to cause the illuminated portion of the reflecting surface to appear as a lighted figure gridded with one or more parallel shaded areas, means for turning the projector to align the shaded areas of the figure in parallelism with the apparent motion of ground objects visible in the lighted areas of the figure, a drift scale fixed on the floor of the aircraft, and a pointer fixed to the shaft of the projector in parallelism with the shaded areas of the figure and in cooperative relation with the said scale.

UZAL G. ENT.